United States Patent [19] [11] Patent Number: 4,789,815
Kobayashi et al. [45] Date of Patent: Dec. 6, 1988

[54] LINEAR MOTOR

[75] Inventors: Fumio Kobayashi; Kunio Sakai; Jun Yamagashi, all of Yokohama, Japan

[73] Assignee: Ohi Seisakusho Co., Ltd., Yokohama, Japan

[21] Appl. No.: 73,214

[22] Filed: Jul. 14, 1987

[30] Foreign Application Priority Data

Jul. 23, 1986 [JP] Japan .................. 61-173403
Jun. 16, 1987 [JP] Japan .................. 62-148040

[51] Int. Cl.⁴ .......................... H02K 41/02
[52] U.S. Cl. ........................ 318/135; 310/12; 104/190
[58] Field of Search .............. 310/12, 13, 15, 17, 310/27; 318/38, 135; 104/290-294

[56] References Cited

U.S. PATENT DOCUMENTS

| 4,318,038 | 3/1982 | Munehiro | 310/27 |
| 4,507,597 | 3/1985 | Trost | 318/135 |
| 4,613,805 | 9/1986 | Matsuo | 318/135 |
| 4,624,617 | 11/1986 | Belna | 318/135 |
| 4,633,108 | 12/1986 | Von der Heide | 310/12 |
| 4,638,192 | 1/1987 | Von der Heide | 310/12 |
| 4,641,065 | 2/1987 | Shibuki | 318/135 |
| 4,658,162 | 4/1987 | Koyama | 318/135 |
| 4,678,971 | 7/1987 | Kanazawa | 318/135 |

FOREIGN PATENT DOCUMENTS 0041846 12/1981 European Pat. Off. .
0179482 11/1984 Japan .
0098489 7/1985 Japan .

Primary Examiner—R. Skudy
Attorney, Agent, or Firm—Foley & Lardner, Schwartz, Jeffery, Schwaab, Mack, Blumenthal & Evans

[57] ABSTRACT

A linear motor comprises a rail; a runner moved along the rail; a plurality of permanent magnets disposed in the rail along the longitudinal direction of the rail so as to alternately arrange the opposite polarities of the permanent magnets; coils disposed in the runner and arranged to oppose the permanent magnets; Hall elements disposed in the coils; and a control unit disposed in the runner and controlling an electric current supplied to the coils based on signals output from the Hall elements.

5 Claims, 6 Drawing Sheets

LINEAR MOTOR

BACKGROUND OF THE INVENTION

The present invention relates to a linear motor for moving an object such as a curtain, having a guide rail for slidably guiding a runner to which the object is connected.

A prior art linear motor is disclosed, for instance, in the Japanese Laid-Open Utility Model No. 60-98489. The linear motor disclosed in this utility model comprises a guide rail and a runner to which one end of an object such as a curtain is fixed. The runner is slidably guided in the guide rail and linearly driven to open and close the curtain.

To drive the runner linearly, permanent magnets are continuously disposed in the guide rail such that adjacent magnets have different polarities. A pair of comb-like electrodes connected to a power source are arranged in the guide rail to extend in the longitudinal direction of the guide rail. The runner is provided with power supplying brushes slidably contacting the comb-like electrodes, and coils energized by the brushes.

When the coils of the runner are energized, the runner is linearly driven by currents flowing in the coils and the magnetic flux of the permanent magnets in the guide rail according to Fleming's left-hand rule. According to the movement of the runner and depending on a contacting state between the comb-like electrodes arranged in the guide rail and the brushes of the runner, the polarities of the coils of the runner are changed such that the runner is linearly driven in the same direction.

In such a prior art linear motor, the runner is energized through the comb-like electrodes provided in the guide rail and the brushes provided in the runner so that the structure of the motor is complicated, and the electrically sliding portions tend to cause imperfect contact, causing a malfunction and deteriorating durability. Further, the runner, due to its structure, requires a separate driving circuit so that the runner and the driving circuit are installed at different locations, causing a problem that operating efficiency in assembly is reduced.

A movable coil-type linear motor in the prior art is disclosed, for instance, in the Japanese Laid-Open Utility Model No. 59-179482. According to the disclosure, permanent magnets are continuously disposed in a band-like shape along a rail such that S-poles and N-poles appear alternately. A pair of the bands of permanent magnets are arranged to face each other such that each pair of permanent magnets which face each other have opposite polarities. Between the bands of permanent magnets, there is movably disposed a runner having coils and current collecting brushes.

The direction of current flowing through the coils must correspond to the polarity of the permanent magnets such that a thrust force is generated by the current flowing through the coils and the magnetic flux of the permanent magnets. To satisfy this requirement, a pair of contact wires cross each other between adjacent different magnetic poles in an extending direction of the permanent magnets, and the collecting brushes of the runner collect electricity from the crossing pair of the contact wires. When the collecting brushes are moved, sparks are caused by electrical gaps at the crossing portions of the contact wires. Due to the sparks, the collecting brushes tend to be worn, rapidly deteriorating the durability thereof and destabilizing the supply of power to the coils.

SUMMARY OF THE INVENTION

To cope with such problems of the prior art, an object of the present invention is to provide a linear motor having a runner and a driving circuit which are integrally formed with no electrically sliding portions.

Another object of the present invention is to provide a movable coil-type linear motor having current collecting brushes in which the durability of the brushes is improved and the current collecting capacity of coils is stabilized.

In order to accomplish the objects, the present invention provides, in a first embodiment, a linear motor for moving an object along a guide rail, the object being connected to a runner, and the runner being slidably guided by the guide rail. Permanent magnets are arranged continuously at predetermined pitches in the longitudinal direction of the guide rail such that adjacent permanent magnets have different polarities. The runner is provided with at least a pair of coils facing the permanent magnets, and Hall elements connected to the coils. The runner is further provided with a driving circuit for controlling currents flowing through the coils according to signals from the Hall elements.

According to the above arrangement, when the coils are energized, the runner is moved by a magnetic action between the coils and the permanent magnets arranged in the guide rail.

When the runner is moved to change the positional relation between the polarities of the permanent magnets and the coils, thus changing the polarities of the permanent magnets of the guide rail detected by the Hall elements, the polarities of the Hall elements and the outputs thereof are inverted. The outputs of the Hall elements are adjusted by the driving circuit and outputted to the coils so that the direction of current flowing in the coils are controlled according to the moving position of the runner. The energization of the coils is controlled such that a thrust force acts always in one direction in relation to the permanent magnets of the guide rail.

The runner is simply connected to a power source so that a fitting operation is facilitated.

According to a second embodiment of the present invention, a linear motor comprises a rail having a pair of parallel contact wires for supplying electric power, a runner movable with respect to the rail, permanent magnets continuously arranged in the rail such that adjacent permanent magnets have different polarities, coils disposed in the runner to face the permanent magnets, Hall elements arranged substantially in the centers of the coils respectively, a controlling portion for switching the directions of current supplied to the coils according to signals from the Hall elements, and current collecting brushes contacting the contact wires.

With the above arrangement, when an electric current is applied to the pair of contact wires, the current flows through the coils via the collecting brushes. By the current and the magnetic flux of the permanent magnets, the runner moves along the rail according to the Fleming's left-hand rule. At this time, the collecting brushes slide along the pair of contact wires which are arranged in parallel with each other with no electrical gaps so that electrical power is stably supplied to the coils, and wear in the collecting brushes is reduced, improving the durability thereof. The current is supplied to the pair of parallel contact wires from the outside, and the controlling portion for switching the polarities of the current supplied to the coils is integral with the runner so that a control wiring for connecting the runner to the external power source is eliminated, reducing the overall size of the linear motor.

BRIEF DESCRIPTION OF THE DRAWINGS

The other objects, features and advantages of the present invention will become more apparent from the following descriptions of the preferred embodiments taken in conjunction with the accompanying drawings in which.

DETAILED DESCRIPTION OF THE PREFERRED EMBODIMENTS

The preferred embodiments of the present invention will be described in detail with reference to the drawings.

Figure 1:
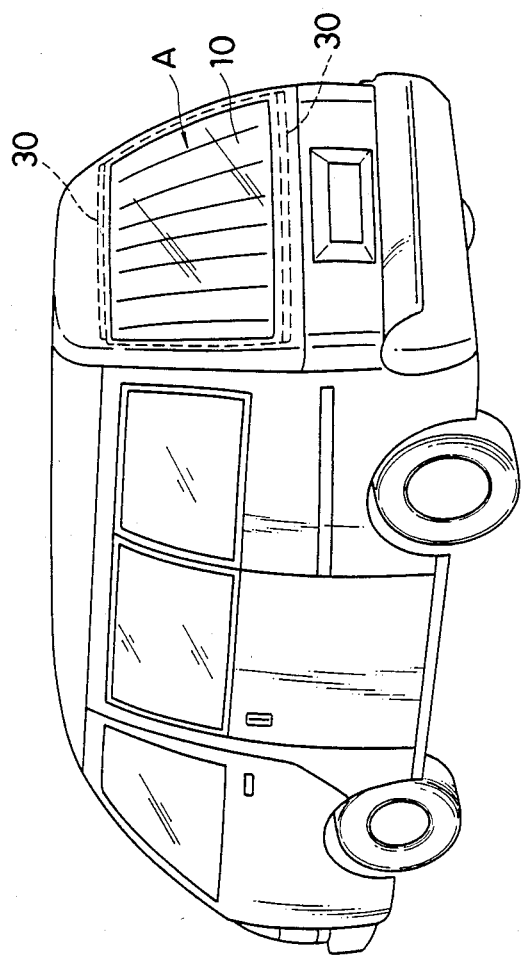
FIG. 1 is a perspective view of a vehicle using a first embodiment according to the present invention.

FIGS. 1 to 8 show a first embodiment of the present invention. As shown in FIG. 1, a curtain 10 which is an object to be moved is disposed on a rear window "A" of a vehicle. A linear motor moves the curtain 10 horizontally to open and close the same.

Figure 2:
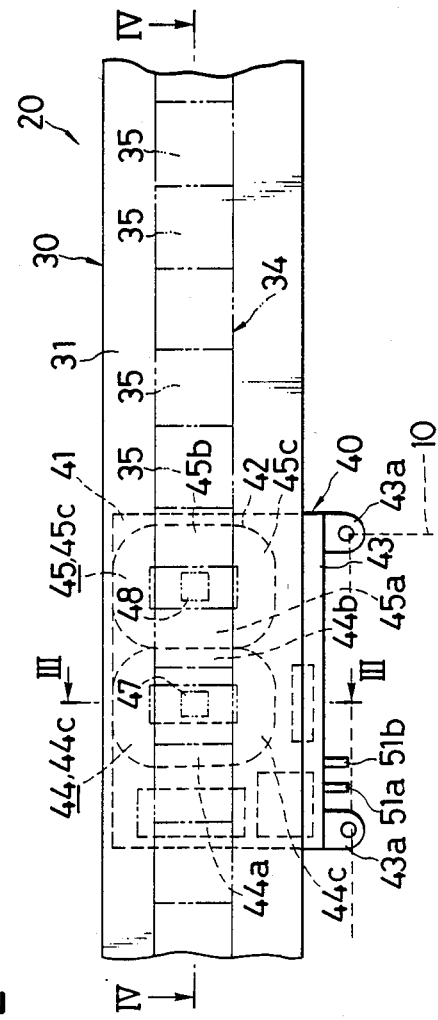
FIG. 2 is a front view of a linear motor according to the first embodiment.

As shown in FIGS. 1 and 2, guide rails 30 each constituting a part of a linear motor 20 are disposed substantially horizontally in upper and lower portions of an opening of the rear window "A" respectively. A runner 40 is slidably engaged with each guide rail 30. The curtain 10 is of a folded type, and its edge is fitted to the runner 40.

Figure 3:
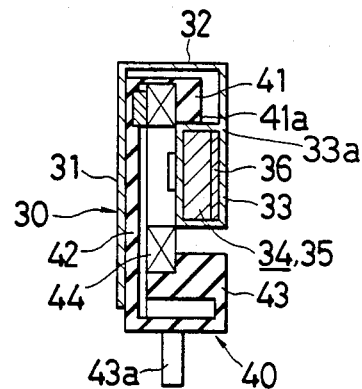
FIG. 3 is a cross-sectional view taken along the line III—III shown in FIG. 2.
Figure 4:
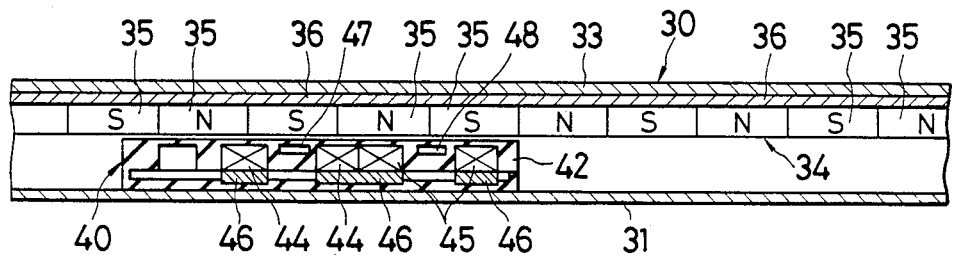
FIG. 4 is a cross-sectional view taken along the line IV—IV shown in FIG. 2.
Figure 5:
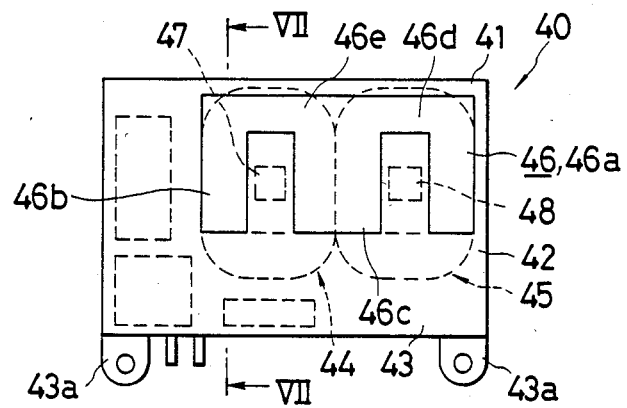
FIG. 5 is a front view of a runner according to the first embodiment.
Figure 6:
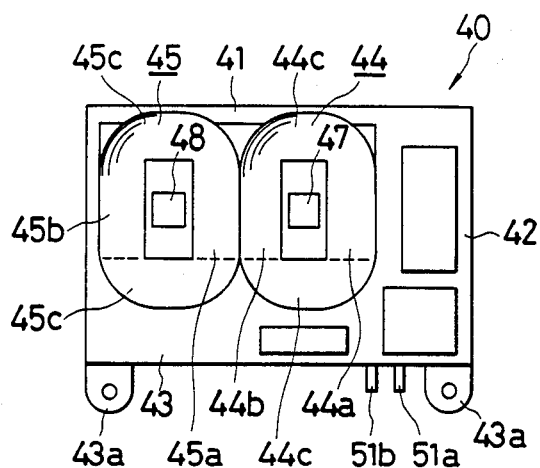
FIG. 6 is a rear view of the runner.
Figure 7:
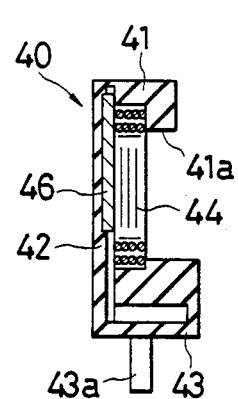
FIG. 7 is a cross-sectional view taken along the line VII—VII shown in FIG. 5.

As shown in FIGS. 2, 3 and 4, each guide rail 30 has a vertical guide wall 31, and opens downwardly. The guide rail 30 is provided with a magnet supporting portion 33 which projects inwardly and faces a top portion 32 and the guide wall 31. The cross-section of the guide rail 30 is in the shape of a groove downwardly opening.

The magnet supporting portion 33 of the guide rail 30 holds a band-like continuous magnetic member 34. The magnetic member 34 comprises permanent magnets 35 magnetized alternately at predetermined constant pitches, where adjacent permanent magnets 35 have different polarities. Each magnet 35 is polarized between opposed sides thereof, i.e., the left and right direction in FIG. 3. A yoke 36 is attached to the backs of the magnets 35.

As shown in FIG. 2, an edge of the curtain 10 is connected to the runner 40. In FIG. 3, a head portion 41 of the runner 40 is inserted into the guide rail 30, and a sliding face 41a on the lower surface of the head portion 41 is slidably mounted, via rollers, etc., on a sliding face 33a of the upper surface of the magnet supporting portion 33 of the guide rail 30.

From the head portion 41, a guided portion 42 extends downwardly along the guide wall 31 of the guide rail 30, and a base portion 43 is formed at a lower end of the guided portion 42 to accommodate electric elements, etc., therein. Hooking legs 43a for connecting the edge of the curtain 10 project from the base portion 43.

A pair of flat coils 44 and 45 are disposed between the head portion 41 and the base portion 43 of the runner 40 along the guided portion 42 and along the longitudinal direction of the guide rail 30 to face the continuous magnetic member 34 of the guide rail 30.

The coils 44 and 45 have linear portions 44a and 44b, and 45a and 45b respectively which are orthogonal to the magnetic flux of the permanent magnets 35 at the time of the movement of the runner 40, and which form loops together with connecting portions 44c and 45c respectively.

A yoke 46 is interposed between the coils 44 and 45 and the guided portion 42. The yoke 46 faces the yoke 36 of the guide rail 30 with the permanent magnets 35 and the coils 44 and 45 between them to constitute a magnetic circuit.

The yoke 46 comprises side portions 46a and 46b extending along the linear portion 44a of the coil 44 and the linear portion 45b of the coil 45 respectively, a center projection 46c extending along the linear portion 44b of the coil 44 and the linear portion 45a of the coil 45, and connecting portions 46d and 46e, forming substantially an E-shape.

A first Hall element 47 is arranged in the center of the coil 44, and a second Hall element 48 in the center of the coil 45. As is well known, the first and second Hall elements 47 and 48 have a characteristic for inverting their polarities according to the direction of magnetic flux acting thereon.

Figure 8:
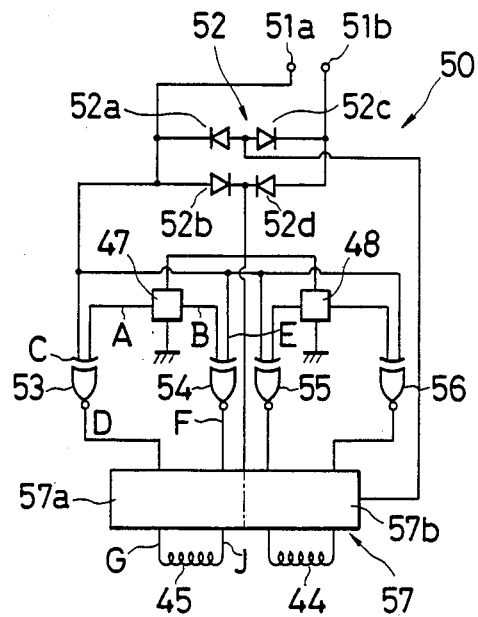
FIG. 8 is a circuit diagram of a driving circuit according to the first embodiment.
Figure 9:
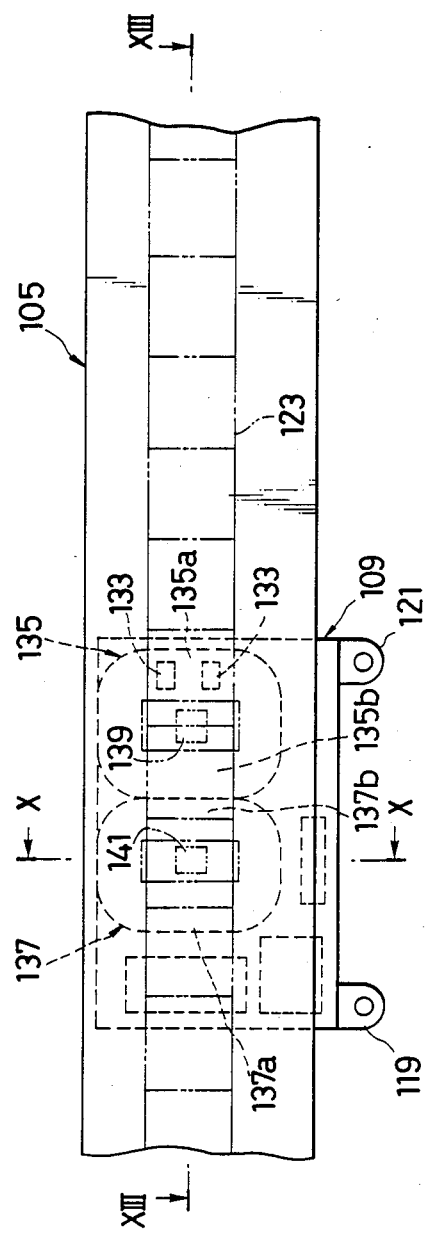
FIG. 9 is a front view of a linear motor according to a second embodiment of the present invention.

As shown in FIG. 8, the coils 44 and 45 and the first and second Hall elements 47 and 48 constitute a driving circuit 50 which is molded or accommodated in the runner 40 between the base portion 43 and a side portion of the runner 40.

The driving circuit 50 comprises a current directing portion 52 including power source terminals 51a and 51b and diodes 52a to 52d; the above-mentioned first and second Hall elements 47 and 48; exclusive NOR gates 53 to 56; and a driving IC 57 to which the coils 44 and 45 are connected.

The power source terminals 51a and 51b are connected to a power source through an operation switch (not shown) which can switch the current flowing direction. The driving IC 57 comprises a first controlling portion 57a corresponding to the coil 45, and a second controlling portion 57b corresponding to the coil 44. The coil 45 is connected to the first Hall element 47 of the coil 44 through the first controlling portion 57a, and the coil 44 is connected to the second Hall element 48 of the coil 45 through the second controlling portion 57b.

Table 1 shows truth values by the first controlling portion 57a in connection with output signals "D" and "F" of the exclusive NOR gates 53 and 54, and signals "G" and "J" transmitted to input/output terminals.

TABLE 1

| D | F | G | J |
|---|---|---|---|
| H | H | L | L |
| H | L | H | L |
| L | H | L | H |
| L | L | High impedance | |

The operation of the above arrangement will next be described.

The operation switch (not shown) is operated to supply an electric current to the power source terminals 51a and 51b of the driving circuit 50. Then, according to the position of the runner 40, the first and second Hall elements 47 and 48 invert their polarities determined by positional relation between the Hall elements and the magnetic poles of the permanent magnets 35 at that time, and output the results.

According to truth values described later, the current flows through the coils 44 and 45. By the current flowing through the linear portions 44a, 44b, 45a and 45b of the coils 44 and 45, and by the magnetic fluw of the permanent magnets 35, a force for moving the coils 44 and 45 is generated according to the Fleming's left-hand rule, thereby linearly driving the runner 40 to open and close the curtain 10.

When the first Hall element 47 is operated to energize the coil 45 according to the positional relation with respect to the magnetic pole of one permanent magnet 35 at that time, the second Hall element 48 is located between two permanent magnets 35 where there is no magnetic flux, outputting no signal, so that the coil 44 is not energized. According to the movement of the runner 40, the above-mentioned operation is repeated alternately.

If the runner 40 is moved about a half pitch of the permanent magnets 35, changing the relation between the coils 44 and 45 and the permanent magnets 35, the second Hall element 48 detects, according to the change, the magnetic flux of one permanent magnet 35, flowing a current through the coil 44. Then, according to the mutual action of the current flowing through the linear portions 44a and 44b of the coil 44 and the magnetic flux of the permanent magnet 35, the runner 40 is moved in the forward or backward direction. when the runner 40 moves further, the directions of current flowing through the coils 44 and 45 are inverted so that the runner 40 is controlled to move always in the same direction.

Although situations may be changed depending on the position of the runner 40, the magnetic flux of an N-pole of one permanent magnet 35 is collected by, for instance, the center projection 46c of the yoke 46, and passes through the connecting portions 46d and 46e which are magnetic paths, divided into the side portions 46a and 46b, and passes through S-poles of other permanent magnets 35 and through the yoke 36, closing the magnetic circuit.

When the magnetic flux passes through air gaps, the magnetic path is narrowed because an area of one permanent magnet 35 is larger than each area of the side portions 46a and 46b, increasing the magnetic flux density of portions for generating a driving force. As a result, a large driving force is generated by the magnetic action of the magnetic flux with respect to the coils 44 and 45.

Even when the mutual positional relation between the coils 44 and 45 and the permanent magnets 35 is changed according to the movement of the runner 40, current flowing through the coils 44 and 45 is controlled by the outputs of the first and second Hall elements 47 and 48 determined according to the inversion of the magnetic flux of the permanent magnets 35 caused by the change. As a result, the driving force in the same direction is continuously generated.

When the energization is stopped, the curtain 10 is stopped at that position, and, when the energization is inverted, the runner 40 is linearly driven to close the curtain 10.

The driving circuit 50 is operated such that the runner 40 is driven in the same direction.

Namely, Table 2 shows, considering the coil 45, truth values between output signals of the first Hall element 47, i.e., input signals A and B transmitted to one input terminals of the exclusive NOR gates 53 and 54, input signals C and E transmitted to the other input terminals of the exclusive NOR gates 53 and 54, signals D and F transmitted to the first controlling portion 57a of the driving IC 57, output signals G and J transmitted to the coil 45, and the polarity of the permanent magnet 35.

TABLE 2

| | C | A | D | E | B | F | G | J |
|---|---|---|---|---|---|---|---|---|
| N-pole | H | H | H | H | L | L | H | L |
| S-pole | H | L | L | H | H | H | L | H |

Considering the signals G and J which determine the polarity of the coil 45, the outputs are inverted with respect to the polarity of the permanent magnet 35 such that attraction or repulsion is always maintained according to the movement. The mutual relation between the coil 44 and the permanent magnets 35 is set in the same manner as that for the coil 45.

As described in the above, according to the linear motor of the present invention, Hall elements are used to invert the polarity of coils to generate a force for driving the runner linearly. Namely, no contacts are used to switch the power supplying direction. In addition, a driving circuit is accommodated in the runner, simplifying the overall structure of the linear motor and making the assembling operation easier. Since there are no electrical sliding portions, wear and imperfect contact are not be caused in the linear motor, improving the durability of the linear motor.

Figure 10:
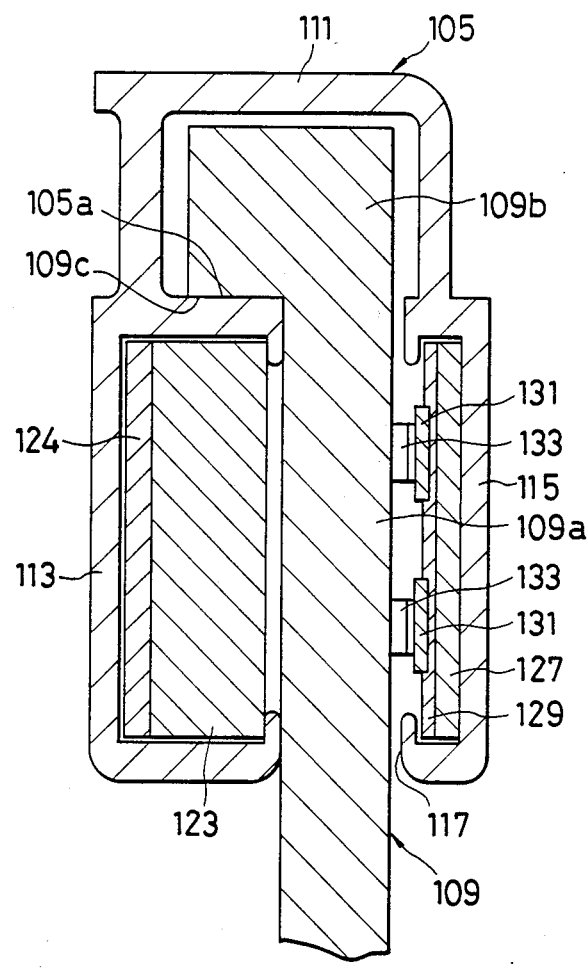
FIG. 10 is a cross-sectional view taken along the line X—X shown in FIG. 9.

FIGS. 9 to 13 show a second embodiment of the present invention. A guide rail 105 similar to the guide rail 30 shown in FIG. 1 constitutes a part of the linear motor shown in FIG. 9. As shown in FIG. 10 which shows an enlarged cross-section taken along line X—X shown in FIG. 9, the rail 105 has a runner supporting portion 111 located in an upper portion thereof for slidably supporting the runner 109, a permanent magnet supporting portion 113, and a contact wire supporting portion 115, the portions 113 and 115 extending from opposite ends of the runner supporting portion 111 along both sides of the runner 109 and being open toward the both sides of the runner 109. A lower portion of the guide rail 105 has an opening 117 from which the runner 109 projects downwardly. Fitting portions 119 and 121 are provided at a lower end of the runner 109 and project from the opening 117 to hand a curtain 10 shown in FIG. 1 therefrom.

The runner 109 mainly comprises a main body portion 109a in which coils and Hall elements to be explained later are accommodated, and a head portion 109b whose angle portion 109c slides on a slide surface 105a of the rail 105.

The permanent magnet supporting portion 113 of the rail 105 supports a band-like permanent magnet 123 which is magnetized with N-poles and S-poles alternately at predetermined pitches in the longitudinal direction of the rail 105. A yoke 124 is attached onto the back side of the permanent magnet 123. The yoke 124 constitutes a magnetic circuit for passing the magnetic flux of the permanent magnet 123.

Figure 11:
FIG. 11 is an explanatory view of an arrangement of contact wires of the second embodiment.
Figure 12:
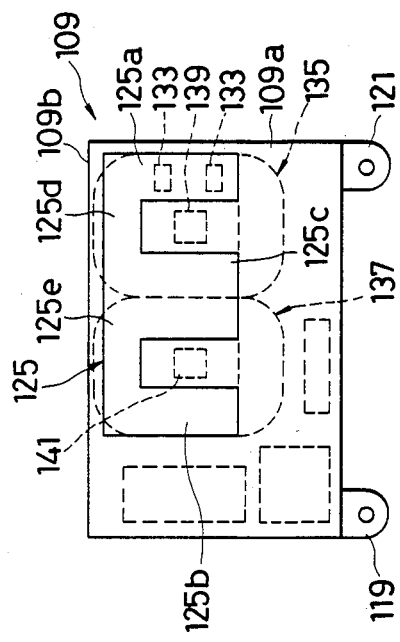
FIG. 12 is a rear view of a runner according to the second embodiment.

The contact wire supporting portion 115 of the rail 105 supports a pair of contact wires 131 through a supporting plate 127 and an insulating plate 129. As shown in FIG. 11, the contact wires 131 extend in parallel with each other along the rail 105. Current collecting brushes 133 arranged on the runner 109 slide on the contact wires 131.

The main body portion 109a of the runner 109 accommodates a pair of flat coils 135 and 137 which are disposed along the longitudinal direction of the rail 105 to face the permanent magnet 123 of the rail 105.

A yoke 125 is provided on the main body portion 109a of the runner 109 to face the contact wire supporting portion 115 of the rail 105. The yoke 125 comprises side portions 125a and 125b extending along a linear portion 135a of the coil 135 and a linear portion 137a of the coil 137 respectively, a center projection 125c extending along a linear portion 135b of the coil 135 and a linear portion 137b of the coil 137, and connecting portions 125d and 125e, forming substantially an E-shape. The yokes 124 and 125 constitute a magnetic path for passing the magnetic flux of the permanent magnet 123.

A first Hall element 139 is disposed in the center of the coil 135, and a second Hall element 141 in the center of the coil 137. As is well known, the first and second Hall elements 139 and 141 have a characteristic for inverting their polarities according to the direction of magnetic flux acting thereon.

Figure 13:
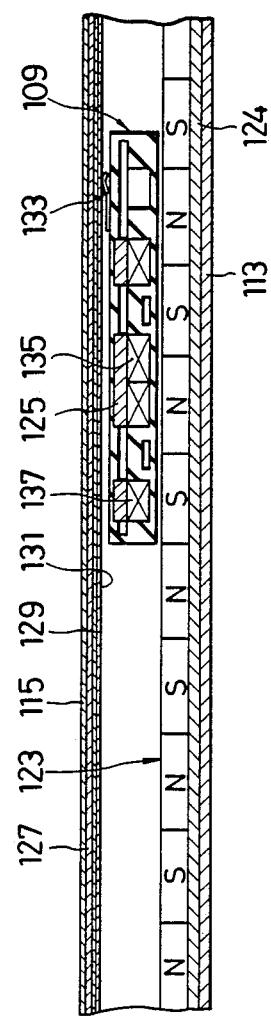
FIG. 13 is a cross-sectional view taken along the line XIII—XIII shown in FIG. 9.

The coils 135 and 137, the first Hall element 139, and the second Hall element 141 constitute a driving circuit which is molded or accommodated in the runner 109 between the main body portion 109a and a side portion of the runner 109. The driving circuit has the same arrangement as that of the driving circuit 50 shown in FIG. 8. As shown in FIG. 13, power supply terminals of the driving circuit are connected to the collecting brushes 133 which slidably contact the pair of parallel contact wires 131 fitted to the contact wire supporting portion 131 on the runner 109 side. Current supplied to the coils 135 and 137 via the collecting brushes 133 from the contact wires 131 is inverted by the above-mentioned driving circuit.

The operation of the linear motor shown in FIGS. 9 to 13 will next be described.

When a current is supplied to the power supply terminals of the driving circuit via the contact wires 131, the first and second Hall elements 139 and 141 invert, depending on the position of the runner 109, their polarities according to the positional relation with respect to a magnetic pole of the permanent magnet 123 at that time, and outputs the result.

When the current flows through the coils 135 and 137, the current flowing through the linear portions 135a, 135b, 137a and 137b of these coils and the magnetic flux of the permanent magnet 123 generates a force to move the coils 135 and 137 according to the Fleming's left-hand rule, thereby linearly driving the runner 109 to open or close the curtain 10.

When the first Hall element 139 is operated to energize the coil 135 according to the positional relation with respect to a magnetic pole of the permanent magnet 123 at that time, the second Hall element 141 is located between magnet poles of the permanent magnet 123 where there is no magnetic flux, outputting no signals so that the coil 137 is not energized. According to the movement of the runner 109, the above-mentioned operation is repeated alternately.

If the runner 109 is moved about a half pitch of the magnet poles of the permanent magnet 123 to change the relation between the coils 137 and 135 and the permanent magnet 123, the second Hall element 141 detects, according to the change, the magnetic flux of the permanent magnet 123, flowing a current through the coil 137. Then, according to the mutual action of the current flowing through the linear portions 137a and 137b of the coil 137 and the magnetic flux of the permanent magnet 123, the runner 109 is moved in the forward or backward direction. When the runner 109 moves further, the directions of current flowing through the coils 137 and 135 are inverted so that the runner 109 is controlled to be moved always in the same direction.

Although situations may be changed depending on the position of the runner 109, the magnetic flux of an N-pole of the permanent magnet 123 is collected by, for instance, the center projection 125c of the yoke 125, and passes through the connecting portions 125d and 125e which are magnetic paths, divided into the side portions 125a and 125b, and passes through S-poles of the permanent magnet 123 and through the yoke 124, closing the magnetic circuit.

When the magnetic flux passes through air gaps, the magnetic path is narrowed because the area of the permanent magnet 123 is larger than each area of the edge portions 125a and 125b, increasing the magnetic flux density of portions for generating a driving force. As a result, a large driving force is generated by the magnetic action of the coils 137 and 135.

Even when the mutual positional relation between the coils 135 and 137 and the permanent magnet 123 is changed according to the movement of the runner 109, current flowing to the coils 137 and 135 is controlled by outputs of the first and second Hall elements 139 and 141 which are inverted depending on the inversion of the magnetic flux of the permanent magnet 123 due to the above-mentioned change. As a result, the driving force in the same direction is continuously generated.

When the energization is stopped, the curtain 10 is stopped at that position, and, when the energization is inverted, the runner 109 is linearly driven to close the curtain 10.

The driving circuit is operated such that the runner 109 is driven in the same direction.

When the runner 109 slides on the rail 105 to open or close the curtain 10, the current collecting brushes 133 slidably contact the contact wires 131 which are disposed in parallel with each other along the rail 105 with no electrical gaps to collect electricity. As a result, no spark is generated at the time of collecting the electricity, reducing wear in the collecting brushes and improving their durability and stabilizing the power supply for the coils 135 and 137.

Further, the driving circuit including the driving IC acting as a controlling portion for switching the polarity of current supplied to the coils 135 and 137 is not provided outside the linear motor but incorporated within the runner 109, so that the transmission of signals between the elements can easily be carried out, and no control wiring, etc., connected to the outside is required, simplifying the structure and reducing the overall size of the linear motor.

Although the present invention has been used for a curtain for a vehicle, the present invention is not limited to such an application, but applicable for various objects which move linearly.

As described in the above, according to the second embodiment of the present invention, collecting brushes provided on a runner can collect electricity from a pair of contact wires which are disposed in parallel with each other with no electrical gaps, generating no spark reducing wear in the collecting brushes, improving the durability of the collecting brushes and stabilizing power supplied to coils. Further, controlling portions, etc., are disposed in the runner so that the transmissions of signals between the coils, Hall elements, and control portions are easily carried out, and control wiring from the runner to the exterior is not needed, simplifying the structure.

What is claimed is:

1. A linear motor comprising:
   a rail;
   runner means for moving along the rail;
   a plurality of permanent magnets disposed longitudinally in the rail so as to alternately arrange the opposite polarities of the permanent magnets;
   coil means disposed in the runner means and arranged for opposing said permanent magnets;
   Hall elements disposed in the runner means;
   control means disposed in the runner means and controlling an electric current supplied to the coil means based on signals output from the Hall elements;
   said coil means comprising a pair of coils, said Hall elements outputting signals for providing for the coils with polarities opposite the polarities of the permanent magnets adjacent the coils, and said control means comprising a control circuit for switching electric current supplied to the coils based on the signals from the Hall elements; and
   said control means further comprising exclusive NOR gates inputting the signals from the Hall elements and outputting signals for switching the electric current supplied to the coils to said control circuit.

2. A linear motor as claimed in claim 1, wherein said rail has a wiring means for supplying the electric current to the coil means, and a current collecting brush attached to the runner means is disposed to contact the wiring means.

3. A linear motor comprising:
   a rail;
   runner means for moving along the rail means;
   a plurality of permanent magnets disposed in the rail along the longitudinal direction of the rail so as to alternately arrange the opposite polarities of the permanent magnets;
   coil means disposed in the runner means and arranged for opposing said permanent magnets;
   Hall elements disposed in the runner means;
   terminal means disposed in the runner means for supplying an electric current to the coil means; and
   control means disposed in the runner means for controlling electric current supplied through the terminal means to the coil means based on signals output from the Hall elements.

4. A linear motor as claimed in claim 3, wherein said coil means comprises a pair of coils, and said Hall elements output signals for providing for the coils polarities opposite the polarities of the permanent magnets adjacent the coils, and said control means comprises a control circuit for switching the electric current supplied to the coils based on the signals for the Hall elements.

5. A linear motor as claimed in claim 3, wherein said terminal means comprises a pair of terminals connected to an electric source.

* * * * *